United States Patent [19]

Off et al.

[11] 4,448,626

[45] May 15, 1984

[54] METHOD AND APPARATUS FOR APPLYING A WELT TO A GARMENT PANEL

[75] Inventors: Joseph W. A. Off, Irving; Judson H. Early, Dallas; Daniel K. Roady, Dallas; Theodore B. Thayer, Dallas, all of Tex.

[73] Assignee: Haggar Company, Dallas, Tex.

[21] Appl. No.: 408,641

[22] Filed: Aug. 16, 1982

Related U.S. Application Data

[63] Continuation-in-part of Ser. No. 170,750, Jul. 21, 1980, Pat. No. 4,371,074.

[51] Int. Cl.³ .................... A41D 27/20; A41H 43/00; B32B 31/04; B32B 31/10
[52] U.S. Cl. .................... 156/256; 156/267; 156/350; 156/351; 156/353; 156/354; 156/360; 156/517; 156/521; 156/538; 156/556; 2/247; 223/1
[58] Field of Search ............... 156/256, 267, 350, 351, 156/353, 354, 355, 357, 363, 517, 521, 538, 540, 541, 542, 556, 360; 2/247; 223/1

[56] References Cited

U.S. PATENT DOCUMENTS

| | | | |
|---|---|---|---|
| 3,713,948 | 1/1973 | Kluger | 156/351 |
| 3,897,945 | 8/1975 | Faltot et al. | 156/351 |
| 4,156,293 | 5/1979 | Off | 2/247 |
| 4,226,661 | 10/1980 | Off et al. | 156/358 |
| 4,288,280 | 9/1981 | Morin | 156/538 |
| 4,357,197 | 11/1982 | Wilson | 156/521 |

Primary Examiner—Caleb Weston
Attorney, Agent, or Firm—Richards, Harris & Medlock

[57] ABSTRACT

A welt applicating apparatus (10) is disclosed which positions welts (12) on individual garment panels (14) for adhesive attachment. The apparatus (10) includes a holding clamp assembly (136) which moves the tape sideways against fixed guide surfaces (176) to align the welt. A transfer clamp assembly (138) clamps the welt with a transfer clamp (202) and moves the welt into a preselected position between side plates (240–242) of the apparatus (10). A trimming assembly (248) is activated to move inwardly to trim the edges of the welt with cutting blade assemblies including movable blades (266–268) and stationary blades (262–264). A vacuum nozzle (278) collects the material trimmed and the backing layer cut by the cutting assemblies. A setting clamp assembly (282) clamps the welt in the preselected position with an extendable setting clamp mounted on a setting clamp arm (284). The arm pivots adjacent the garment panel. The setting clamp is extended to position the welt against the garment panel (14). A heater bar (346) is lowered to clamp the welt against the garment panel and heat the adhesive on the welt to activate the adhesive to bond the welt to the garment panel.

25 Claims, 16 Drawing Figures

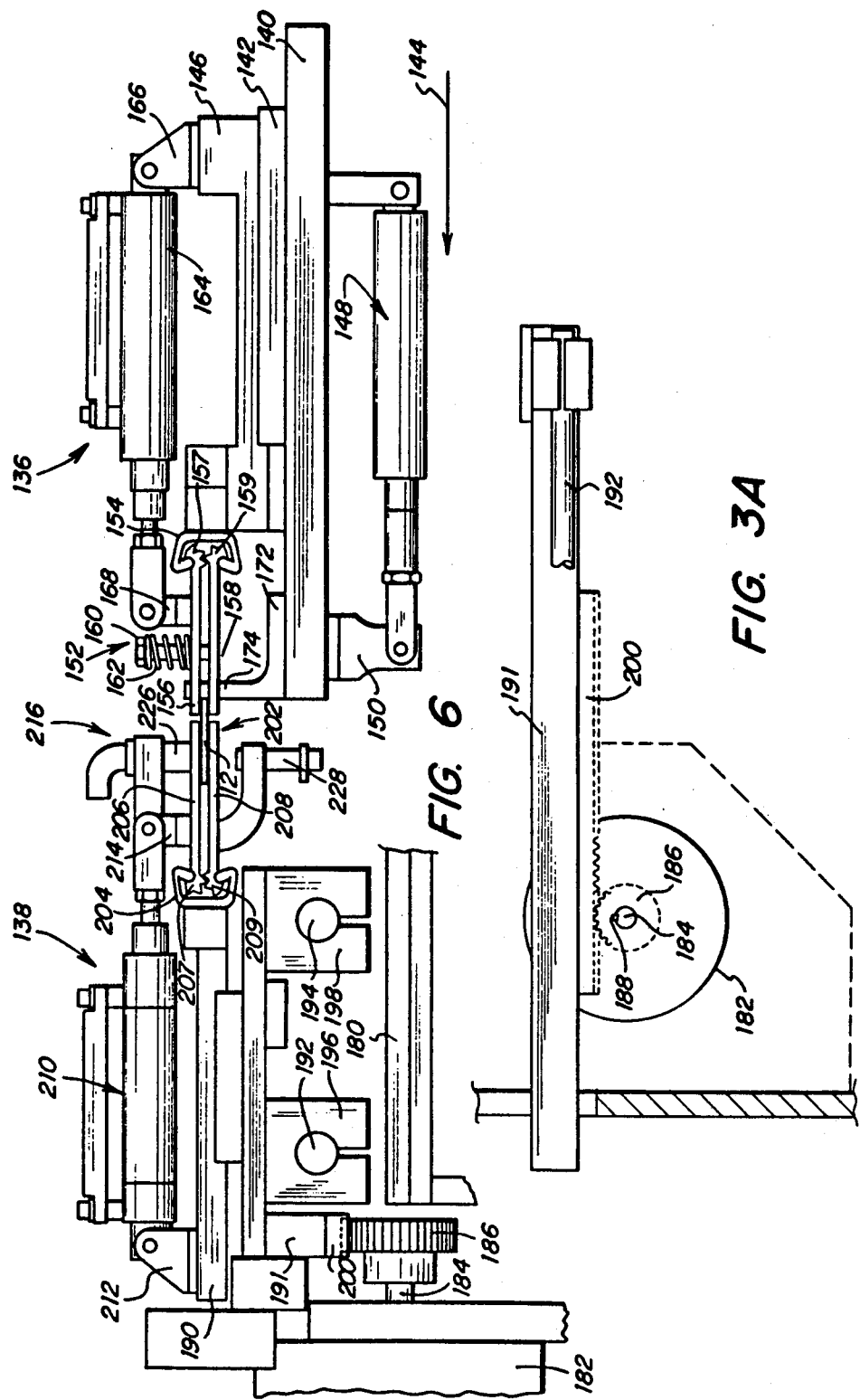

METHOD AND APPARATUS FOR APPLYING A WELT TO A GARMENT PANEL

CROSS-REFERENCE TO RELATED APPLICATIONS

This application is a continuation-in-part of copending U.S. patent application Ser. No. 170,750, filed July 21, 1980, now U.S. Pat. No. 4,371,074 issued Feb. 1, 1983.

TECHNICAL FIELD

This invention relates to the manufacture of clothing and, in particular, to an apparatus and method for use in a system with multiple work stations for automatically implanting pockets into garment panels.

BACKGROUND ART

In the manufacturing of garments, pockets are provided as a means for conveniently carrying useful items such as currency, change, keys, wallets, handkerchiefs and the like. The pockets are integrated into the garment and take the general form of a pouch open at one end to receive such items.

The two basic types of pocket constructions are the patch-type pocket and the standard pocket. The patch-type pocket is secured to the outside surface of the garment and is typically utilized in garments having less formal or leisure applications. Patch-pockets are relatively easily constructed and attached to a garment. In contrast, the standard pocket is positioned inside the garment, thereby presenting a much neater, finished appearance. An opening, usually a slot in the garment, provides access to the standard pocket. However, the standard pocket is relatively complicated in construction and has required numerous manual operations including material cutting, positioning, sewing and trimming. The standard pocket requires use of a welt, which must be accurately positioned and secured to the pocket. Such manual operations are time consuming and can contribute significant expense to the cost of manufacturing a garment. Since the garment industry is characterized by high volume production, it will be appreciated that the overall cost of constructing and finishing pockets can be substantial.

In an attempt to improve upon the manual sewing techniques of the prior art, there has been increasing interest in the use of adhesive as a supplement or complete substitute for sewing stitches. For example, U.S. Pat. No. 4,156,293 to Joseph W. A. Off discloses a pocket construction wherein a garment panel and rectangular pocket blank are secured together and formed into a finished pocket through various folding and adhesive connections. U.S. Pat. No. 4,226,661 to Joseph W. A. Off and Judson H. Early discloses an apparatus for manufacturing prefabricated pocket bags like that shown in U.S. Pat. No. 4,156,293. U.S. Pat. No. 4,315,793 and application Ser. No. 175,576, Pat. No. 4,337,881, filed Aug. 5, 1980 by Joseph W. A. Off and Judson H. Early disclose an apparatus for integrating prefabricated pocket bags into garment panels on a semi-automatic basis wherein each pocket bag and corresponding garment panel are clamped in a template and manually advanced between work stations of the apparatus. However, the production capability of this apparatus is somewhat limited. All of these inventions are assigned to Haggar Company of Dallas, Texas.

Although the adhesive pocket construction techniques developed thus far have proven satisfactory, a need has risen for apparatus for constructing, transporting and indexing sets of garment panels, prefabricated pocket bags and pieces such as welts in a unified manner to achieve increased rates of production.

SUMMARY OF THE INVENTION

In accordance with one aspect of the present invention, an apparatus is provided for positioning a welt on a garment panel at a work station. The apparatus includes holding clamp structure for holding a welt in a fixed position. Transfer clamp structure is provided for holding and moving the welt in a first direction. Trimming structure is provided for trimming at least one edge of the welt. Setting clamp structure is provided for holding the welt and transferring the welt to the work station upon release of the welt by the transfer clamp structure. The setting clamp structure positions the welt on the garment panel, and heating structure is provided for adhering the welt to the garment panel.

In accordance with another aspect of the invention, the holding clamp structure is movable in a second direction transverse the first direction to align the welt against guide surfaces. The transfer clamp structure can also be provided with sensing structure for sensing an edge of the welt to clamp the welt at a desired location along the welt in the first direction. The setting clamp structure can also be provided with a setting clamp extension structure for extending the welt onto the garment panel.

In accordance with still another aspect of the invention, a method for positioning a welt on a garment panel at a work station is provided. The method includes the step of holding the welt with a holding clamp and moving the holding clamp and welt sideways to align the welt against a fixed member having guide surfaces. The welt is then clamped with a transfer clamp. The transfer clamp and welt are moved forward to a preselected position and the welt is trimmed along at least one edge. The welt is clamped by a setting clamp and released from the transfer clamp. The setting clamp moves the welt to the work station and the welt is then secured to the garment panel.

BRIEF DESCRIPTION OF THE DRAWINGS

A more complete understanding of the invention can be had by reference to the following detailed description when taken in conjunction with the accompanying drawings, wherein:

FIG. 2A is a perspective view of a welt and garment panel to which it is secured;

FIG. 3A is a partial vertical side view of the drive mechanism for the transfer clamp assembly;

FIG. 6 is a partial vertical cross-sectional view of the apparatus taken along line 6—6 in FIG. 2 in the direction of the arrows illustrating the holding clamp and transfer clamp assemblies;

DETAILED DESCRIPTION

Figure 2:
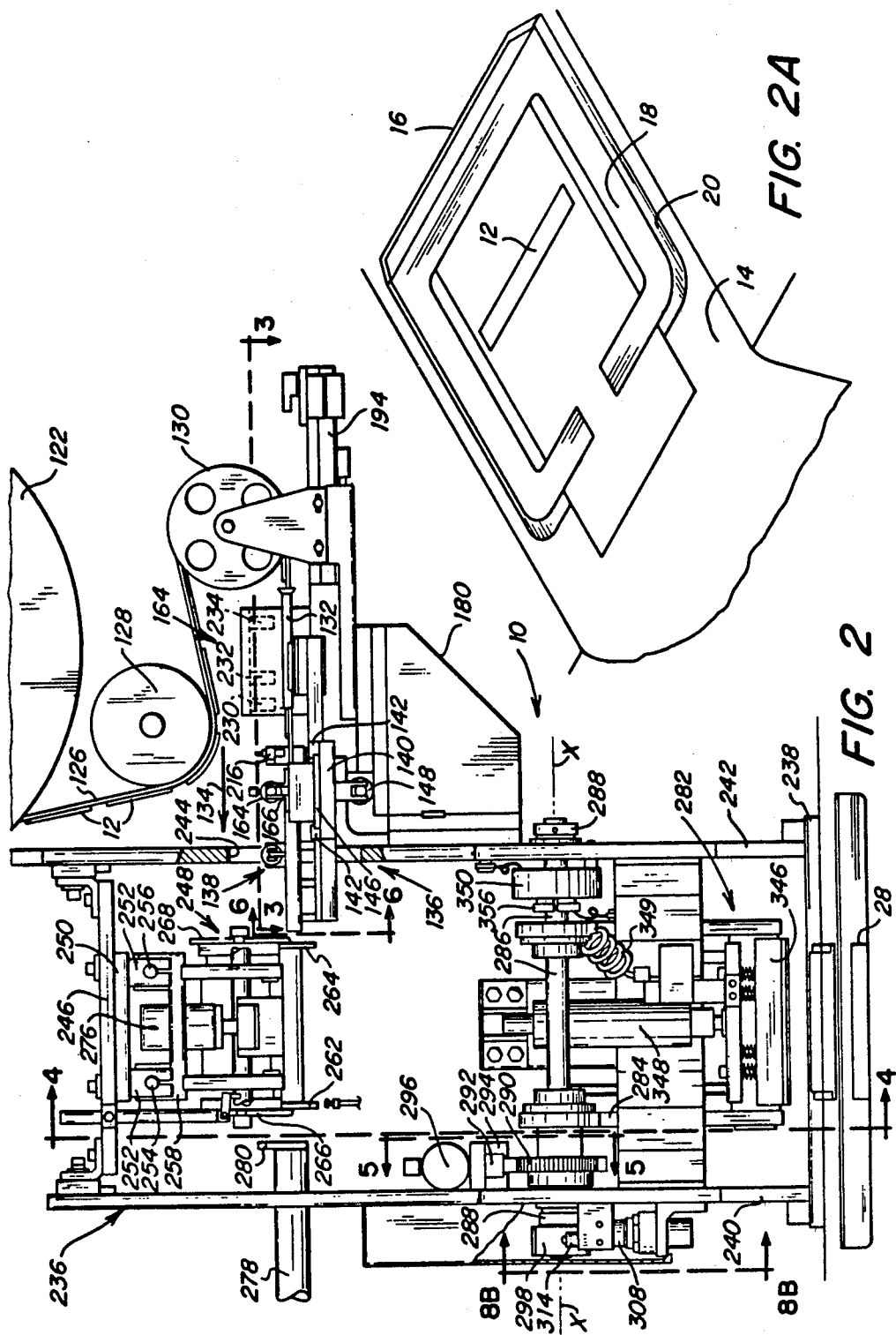
FIG. 2 is a front view of the welt installation apparatus.

Referring now to the drawings, wherein like reference numerals designate like or corresponding parts throughout several views, and particularly referring to FIGS. 2 and 2A, there is shown an apparatus 10 for positioning and securing pocket welts 12 on garment panels 14. The apparatus 10 is particularly adapted for operation on a continuous basis to construct pockets in accordance with the techniques disclosed in U.S. Pat. No. 4,156,293, utilizing prefabricated pocket bags like those fabricated with the device disclosed in U.S. Pat. No. 4,226,661.

The apparatus 10 is adapted for use as one work station along a transport system such as disclosed in U.S. patent application Ser. No. 170,750 filed July 21, 1980, now U.S. Pat. No. 4,371,074, which disclosure is herein incorporated by reference. This application Ser. No. 170,750 discloses a device which includes a number of templates 16 which include upper pivotal portion 18 and lower pivotal portion 20 for clamping and conveying the garment panels 14 along a table having a plurality of work stations. Templates 16 and portions 18 and 20 are identified in U.S. Pat. No. 4,371,074 as templates 46 and portions 46a and 46b.

The operation of the apparatus can be explained by the action of four major components, the holding clamp assembly 136, transfer clamp assembly 138, trimming assembly 248 and setting clamp assembly 282.

The holding clamp assembly 136 acts to hold a welt 12 and move it sideways against a fixed guide surface 176. The transfer clamp assembly 138 senses the position of the welt 12 and clamps the welt 12 while the welt 12 is still held by the holding clamp assembly 136. This permits the welt 12 to be accurately positioned relative to the apparatus 10 in two dimensions.

The transfer clamp assembly 138 then acts to move the welt 12 forward to a preselected position. In this position, the trimming assembly 248 is employed to trim one or more edges of the welt 12. While in the preselected position, the setting clamp assembly 282 operates to clamp the welt 12. Upon release of the welt 12 by the transfer clamp assembly 138, the setting clamp assembly 282 moves the welt 12 adjacent the garment panel 14. The setting clamp assembly 282 includes an extension to move the welt 12 into contact with the garment panel 14. Finally, a heater bar 346 is employed to bond the welt 12 to the garment panel 14.

Figure 1:
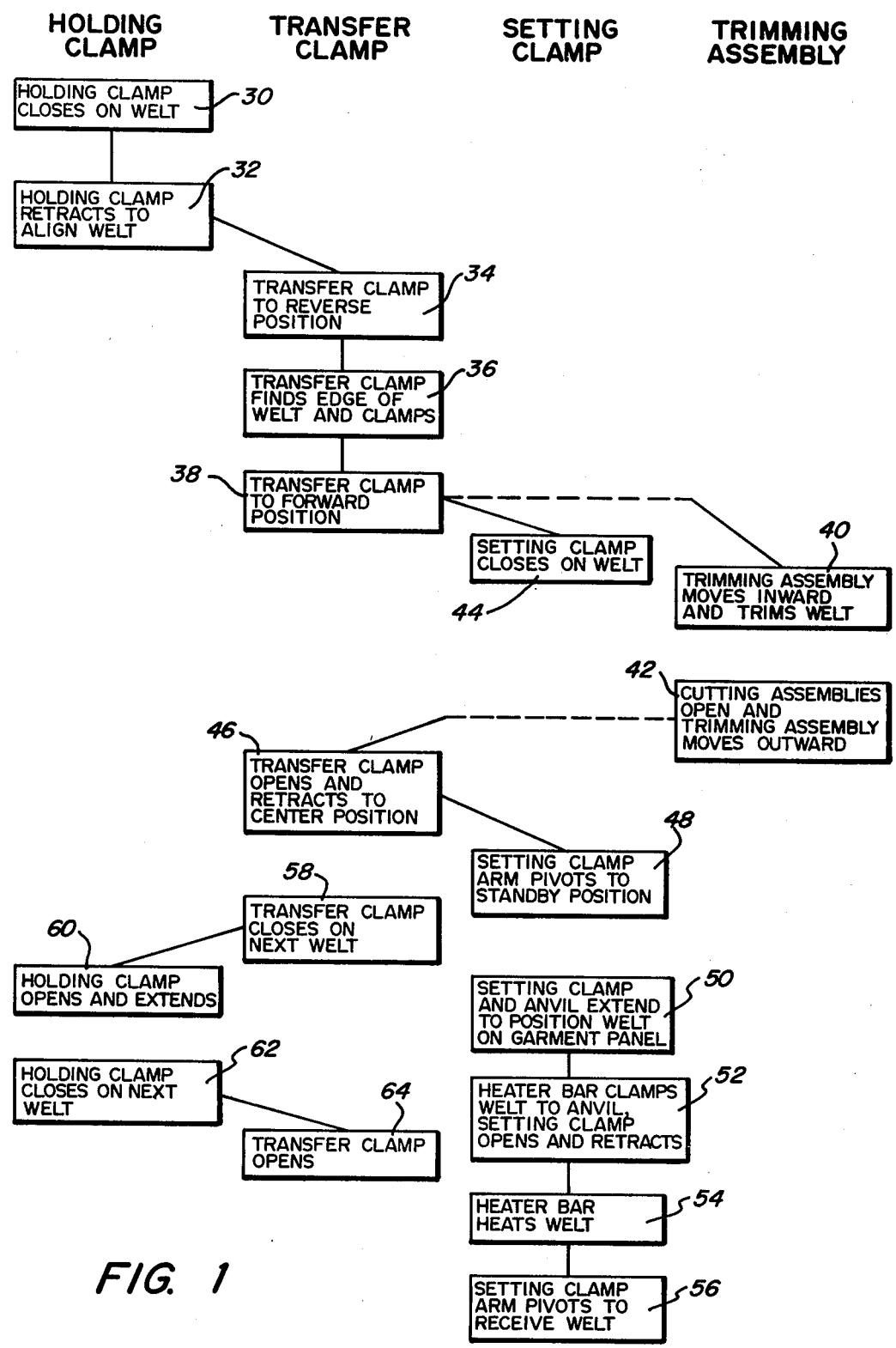
FIG. 1 is a flow chart of the operations performed by a welt installation apparatus forming one embodiment of the present invention.

The sequence of operations is more fully illustrated in FIG. 1. Step 30 represents the clamping of a welt 12 by the holding clamp 152. Step 32 represents the retraction of the holding clamp 152 to align the welt 12 against a guide surface 176. Step 34 represents the motion of the transfer clamp 202 to the reverse position proximate the holding clamp 152. The transfer clamp assembly 138 finds the edge 229 of the welt 12 and clamps the welt 12 as represented by step 36. The transfer clamp 202 is then moved to a forward position to move the welt 12 to the preselected position as represented by step 38. In this sequence of steps, the welt 12 has been positioned in two dimensions at the predetermined position.

Step 40 represents the motion of the trimming assembly 248 forward and the trimming of the welt 12 in the preselected position. Step 42 represents the opening of the cutting assemblies and retraction of the trimming assembly 248. After positioning the welt 12 in the preselected position, the setting clamp assembly 282 can be employed to clamp the welt 12 as represented by step 44.

After trimming, the transfer clamp 202 opens and retracts to a center position away from the welt 12 as represented by step 46. The setting clamp assembly 282 then moves the welt 12 to a standby position adjacent the garment panel 14 as represented by step 48. The setting clamp extension assembly 316 and an anvil 28 are extended to position the welt 12 on the garment panel 14 as represented by step 50. The heater bar 346 then clamps the welt 12 to the anvil 28 and the setting clamp extension assembly 316 is opened and retracted as represented by step 52. The heater bar 346 then proceeds to bond the welt 12 to a garment panel 14 and the setting clamp assembly 282 is moved to receive another welt 12 as represented by steps 54 and 56, respectively.

The next welt 12 is moved proximate the holding clamp assembly 136 as the first welt 12 is moved to the preselected position. The next welt 12 is clamped by the transfer clamp assembly 138 as represented by step 58 to permit the holding clamp 152 to open and extend as represented by step 60. The holding clamp 152 then closes again on the next welt 12 and the transfer clamp 202 opens as represented by steps 62 and 64, respectively. The sequence of steps then repeats.

Referring now to FIG. 2, a supply reel 122 is rotatably mounted on the apparatus 10 which is equipped with a braking device to provide a small resistance to rotation to the reel 122. The reel 122 contains a string of welts 12 located at predetermined distances along a continuous backing tape 126. The reel 122 can be loaded in accordance with the disclosure in U.S. patent application Ser. No. 304,095 filed Sept. 21, 1981, which disclosure is herein incorporated by reference. The tape 126 is threaded about rollers 128 and 130. Each roller is freely rotatable about shafts fixed to the apparatus 10.

The tape 126 is then threaded through a guide tube 132 which directs the tape 126 and welts 12 in a first direction denoted by the arrow 134 in FIG. 2. The holding clamp assembly 136 and transfer clamp assembly 138 are positioned on opposite sides of the tape 126 and welts 12 passing through the guide tube 132.

The holding clamp assembly 136 is best described with reference to FIGS. 2, 3, 3A and 6. The assembly 136 is mounted on a fixed plate 140. Plate 140 has parallel gibs 142 having parallel guide notches extending in a second direction shown by arrow 144, transverse the first direction shown by arrow 134. A holding clamp base 146 is slidable between the gibs 142 along the second direction. A double acting fluid actuator 148 is pivoted at its ends to the fixed plate 140 and a bracket 150 mounted on the base 146. The actuator 148 permits controlled movement of the base 146 relative to the plate 140 both toward and away from the welt 12 and tape 126.

A holding clamp 152 is mounted on the base 146 for clamping the welt 12. The holding clamp 152 includes a channel 154 pivotally supporting upper and lower jaw members 156 and 158. Jaw members 156 and 158 include meshed teeth 157 and 159 to simultaneously pivot the jaw members 156 and 158. A screw 160 is secured in the lower jaw member 158 and extends through an aperture in the upper jaw member 156. A spring 162 is positioned between the screw head and acts against the upper jaw member 156. The spring 162 urges the jaw members 156 and 158 together to clamp a welt 12 positioned between the members 156 and 158.

A double acting fluid actuator 164 is pivotally mounted between the base 146 at bracket 166 and the upper jaw member 156 at bracket 168. The actuator 164 permits the jaw members 156 and 158 to be opened by retracting the piston within the actuator 164. The jaw members 156 and 158 can be closed with a force greater than possible with the spring 162 alone by extending the piston of the actuator 164.

Figure 3:
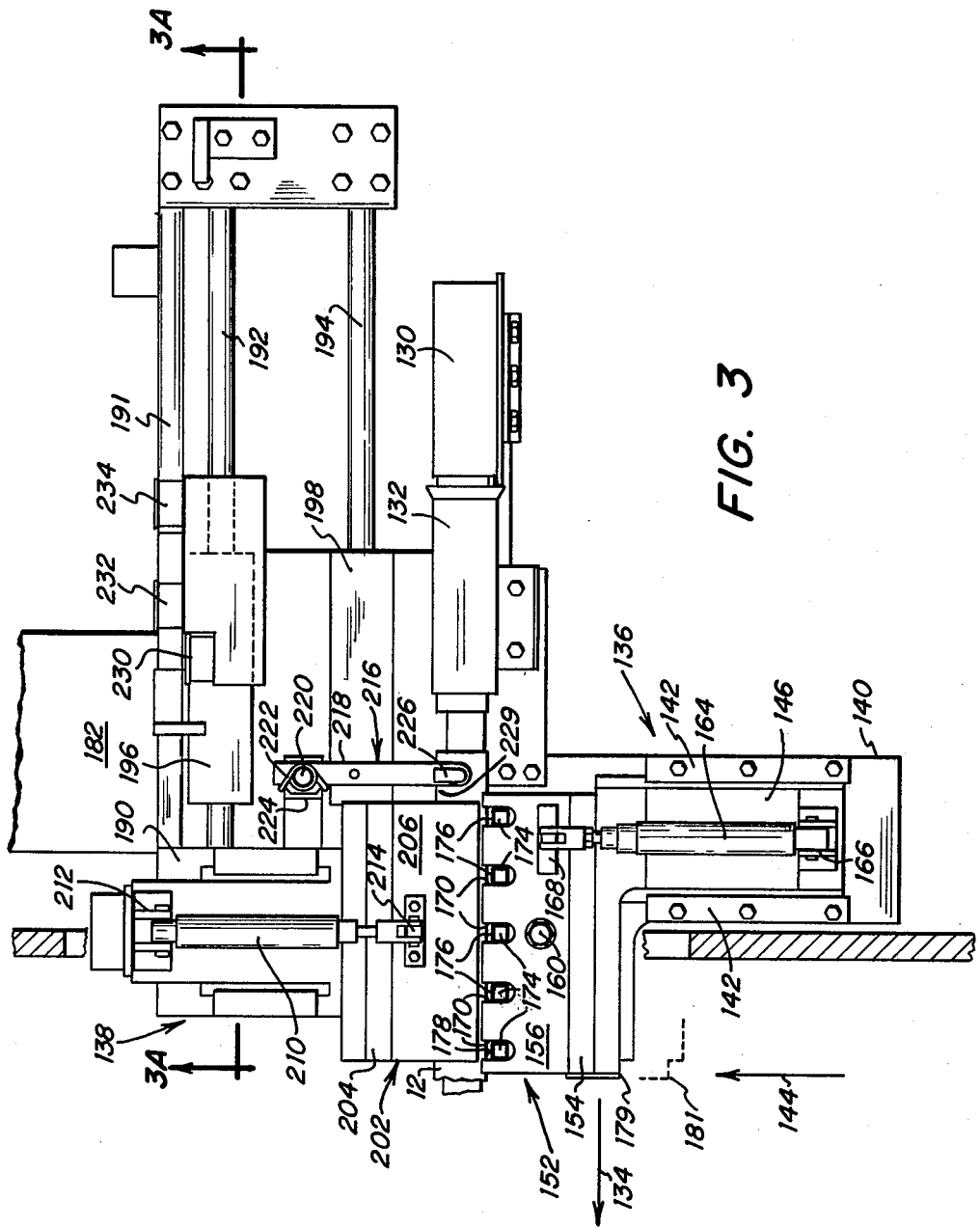
FIG. 3 is a top view of a portion of the welt installation apparatus illustrating the holding and transfer clamp assemblies.

Each of the jaw members 156 and 158 have a plurality of notches 170 formed in their outer face as best seen in FIG. 3. A plate 172 is secured to the plate 140 from which fingers 174 extend upwardly through the notches 170 in both jaw members 156 and 158. The fingers 174 include guide surfaces 176 which lie along the first direction shown by arrow 134.

The jaw members 156 and 158 clamp the welt 12 with the spring force provided by spring 162. By retracting the piston in actuator 148, the jaw members 156 and 158 move the welt 12 toward the guide surfaces 176 on the fingers 174. The edge 178 of the welt 12 contacts the surfaces 176 to align the welt 2 relative to the apparatus 10.

Step 30 of the operating sequence of the apparatus is completed with the holding clamp assembly 136 in the extended position 179 as seen in FIG. 3 in solid line. In this position, the actuator 164 is deactivated so that the force of spring 162 clamps a welt 12 between the jaw members 156 and 158. The actuator 148 operates to retract the welt 12 and jaw members 156 and 158 opposite the second direction shown by arrow 144 so that the edge 178 contacts the guide surfaces 176 to complete step 32. As the jaw members 156 and 158 retract further to the position 181 as seen in FIG. 3 in phantom line, the spring force of spring 162 permits the welt 12 to slip within the jaw members 156 and 158 upon alignment against the guide surfaces 176.

Subsequently in the sequence of operations, the actuator 148 extends the holding clamp 152 to clamp the next welt 12 for alignment against the guide surfaces 176 to complete steps 60 and 62.

The transfer clamp assembly 138 is mounted on a bracket 180 extending from the apparatus 10 as seen in FIGS. 2, 3, and 6. The bracket 180 supports a reversible stepping motor 182 which has a drive shaft 184 as seen in FIG. 3A. A pinion gear 186 is secured to the drive shaft 184 through a key 188.

A transfer clamp base 190 mounts to parallel rods 192 and 194 which slide within bushing blocks 196 and 198 secured on the bracket 180. The rods 192 and 194 and blocks 196 and 198 permit the base 190 to slide along the first direction shown by arrow 134. A gear rack 200 is secured on the base 190 with its gear teeth meshed with the teeth on the pinion 186. The motor 182 therefore is operable to move the base 190 along the first direction shown by arrow 134.

A transfer clamp 202 is mounted on the base 190. The transfer clamp 202 includes a channel 204 supporting upper and lower jaw members 206 and 208. Jaw members 206 and 208 pivot simultaneously as a result of meshed teeth 207 and 209. A double acting fluid actuator 210 is pivotally mounted between a bracket 212 on the base 190 and to the upper jaw member 206 through bracket 214. The actuator 210 permits the selective opening and closing of the jaw members 206 and 208 to clamp a welt 12 therebetween.

A pivotal sensor assembly 216 is also mounted on the base 190. The assembly 216 includes an arm 218 pivotally mounted on pin 220 as seen in FIG. 3. A spring 222 urges the arm 218 against a stop 224 on the base 190. As best seen in FIG. 6, the sensor assembly 216 includes a photoelectric source 226 and a receiver 228 separated by a gap of predetermined width. As can be seen in FIG. 3, the sensor assembly 216 can be used to detect the rear edge 229 of a welt 12 to position the transfer clamp 202 at a predetermined distance from the edge 229.

The transfer clamp 202 can clamp the welt 12 between the jaw members 206 and 208 and the entire assembly 138 can be moved in the first direction shown by arrow 134 to the limit of motion permitted by the rods 192 and 194. Three position sensors, forward position sensor 230, center position sensor 232 and a rearward position sensor 234 are mounted on the bracket 180 to sense the position of the transfer clamp assembly 138 at three selected positions along the first direction shown by arrow 134.

In the sequence of operation of apparatus 10, the transfer clamp assembly 138 moves to a rearward position to clamp a welt 12 aligned by the holding clamp assembly 136 to complete step 34. The rearward position sensor 234 senses movement of the assembly 138 into the rearward position. The sensor assembly 216 is employed to find the edge 229 of the welt 12 to position assembly 138 and clamp the welt 12 a predetermined distance from the edge 229 to complete step 36. With the welt 12 clamped by the transfer clamp assembly 138, the motor 182 is operated to move the entire transfer clamp assembly 138 and clamped welt 12 to a forward position to complete step 38. The forward position sensor 230 senses the motion of the assembly 138 to the forward position.

After trimming with trimming assembly 248 and clamping by the setting clamp assembly 282, the transfer clamp 202 opens and motor 182 drives the transfer clamp assembly 138 into a center position to complete step 46. The center position sensor 232 detects the motion of the assembly 138 to the center position. In order to permit the holding clamp assembly 136 to extend to align the next welt 12, the transfer clamp assembly 138 clamps the welt 12 adjacent the holding clamp assembly 136 to complete step 58. When the holding clamp assembly 136 is extended, the transfer clamp 202 opens to complete step 64.

As seen in FIG. 2, the apparatus 10 includes a stationary frame 236. The frame 236 includes a base 238 and two vertically upstanding plates 240 and 242. The plate 242 includes a large aperture 244 to permit the transfer clamp assembly 138 and welt 12 to travel therethrough between the plates 240 and 242. An upper bracket 246 extends between the two plates 240 and 242 near their upper ends.

Figure 4:
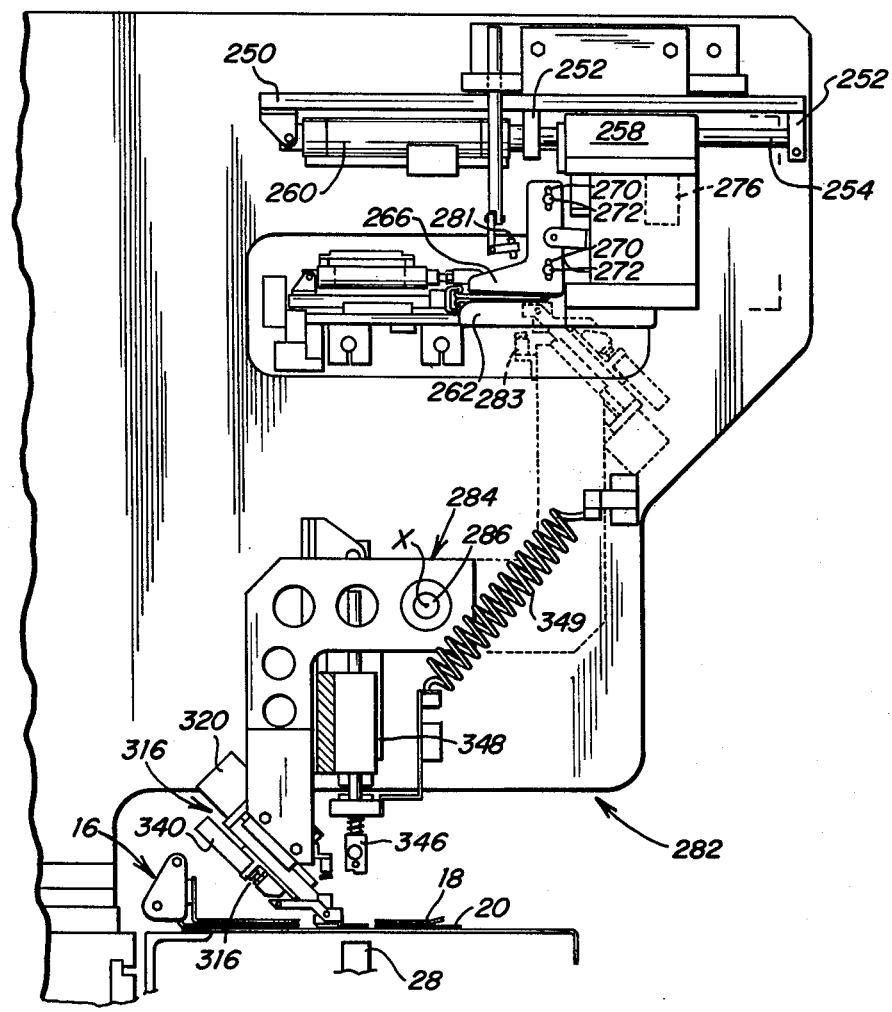
FIG. 4 is a vertical cross-sectional view of a portion of the welt installation apparatus illustrating the setting clamp assembly and taken along line 4—4 in FIG. 2 in the direction of the arrows.
Figure 7:
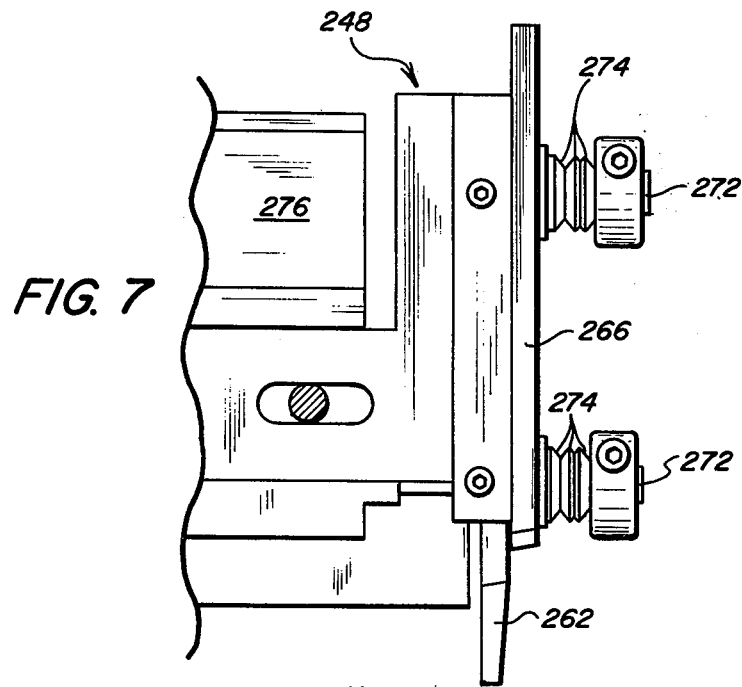
FIG. 7 is a partial side view of the trimming assembly in the apparatus.

The trimming assembly 248 is suspended from the upper bracket 246 as best seen in FIGS. 2, 4 and 7. The trimming assembly 248 includes a fixed plate 250 secured to the bracket 246 supporting four bushing blocks 252. Rods 254 and 256 are each supported at their ends by two blocks 252 in a parallel relationship.

A trimming blade base 258 is mounted on and slidable along the rods 254 and 256 along the second direction shown by arrow 144. A double acting fluid actuator 260 is pivotally mounted between the plate 250 and the base 258 to transverse the base 258 along the rods 254 and 256 as best seen in FIG. 4.

Two stationary blades 262 and 264 are secured on either side of the base 258 as best seen in FIGS. 2, 4 and 7. Movable blades 266 and 268 are mounted on the base for movement past the stationary blades 262 and 264 to trim the welt material between the blades. The movable blades 266 and 268 include elongated notches 270 as seen in FIG. 4 for passage of bolts 272 secured to the base 258 as seen in FIGS. 4 and 7. Belleville washers 274 provide a spring force urging the movable blades 266 and 268 against the base 258 and fixed blades 262 and 264 to insure effective trimming. An air cylinder 276 is operable to pivot the movable blades 266 and 268 past the stationary blades 262 and 264 to perform a trimming operation on a welt 12 positioned between the blades. The air cylinder 276 subsequently opens the movable blades 266 and 268 for the entry of another welt 12 to be trimmed.

The forward position sensor 230 is positioned to sense the presence of the transfer clamp assembly 138 at the forward position so that the welt 12 clamped thereby is at the preselected position which permits accurate trimming of the welt 12 by the trimming assembly 248. The trimming assembly 248 is moved forward by actuator 260 so that the blades surround each end of the welt 12 and the blades are then actuated by air cylinder 276 to trim the welt 12 to complete step 40. When the blades open, the trimming assembly 248 is retracted to complete step 42.

In conjunction with the trimming assembly 248, a vacuum hose 278 is secured at one end to the plate 240. The opposite end of the vacuum hose 278 is secured to a vacuum source (not shown). The end proximate the side plate 240 includes a solenoid actuated valve 280. Concurrently with the trimming operation, the valve 280 is opened to draw the trimmed pieces of the welt 12 and backing layer 126 through the vacuum hose 278 for disposal. When the trimming operation is not being performed, the valve 280 is closed, reducing demands on the vacuum source when the vacuum is not needed.

A flexible light conducting tube 281 is mounted at one end to the frame 236 as seen in FIG. 4. The tube 281 directs light onto a welt 12 properly positioned for trimming. The tube 281 extends to a light source and sensor (not shown) remote from the trimming assembly 248. If a welt 12 is not in position for trimming, an adjustable mirror 283 reflects the light back to the sensor, disabling the trimming assembly 248.

Figure 5:
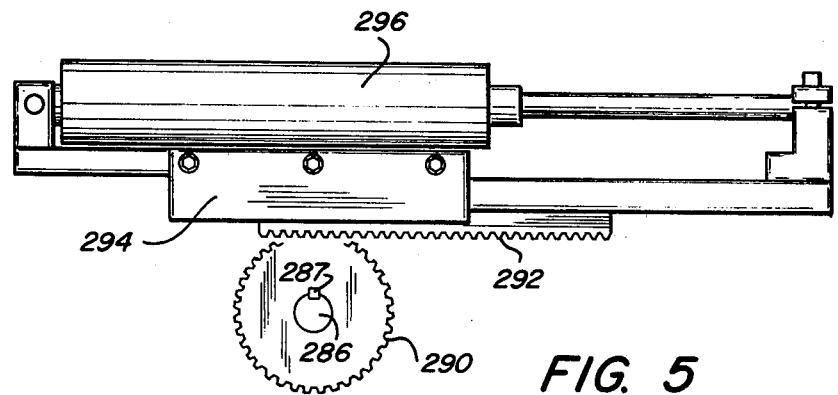
FIG. 5 is a partial vertical cross-sectional view of the apparatus taken along line 5—5 in FIG. 2 in the direction of the arrows which illustrates the transfer clamp assembly actuating mechanism.

A setting clamp assembly 282 is mounted between side plates 240 and 242 as best seen in FIGS. 2 and 4. The setting clamp assembly 282 includes a setting clamp arm 284 rigidly secured to a shaft 286. The shaft 286 is pivotally mounted through bearings 288 to the side plates 240 and 242 for pivotal motion about an axis X—X as shown in FIG. 2. A pinion 290 is fastened to the shaft 286 between the side plate 240 and the arm 284 by a key 287 as best seen in FIGS. 2 and 5. A gear rack 292 is slidable in gibs 294 in the second direction shown by arrow 144 with its teeth meshed with the teeth on the pinion 290. A double acting fluid actuator 296 is mounted between the plate 240 and the rack 292 to permit rotation of the pinion 290 which results in pivotal motion of the arm 284 about axis X—X.

Figure 8A:
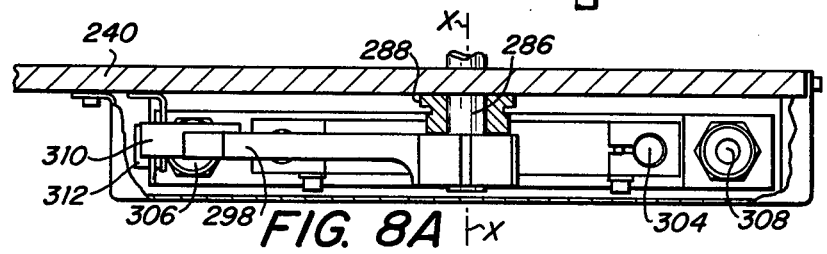
FIGS. 8A and 8B are top and side views, respectively, of the limit motion arm on the setting clamp assembly.
Figure 8B:
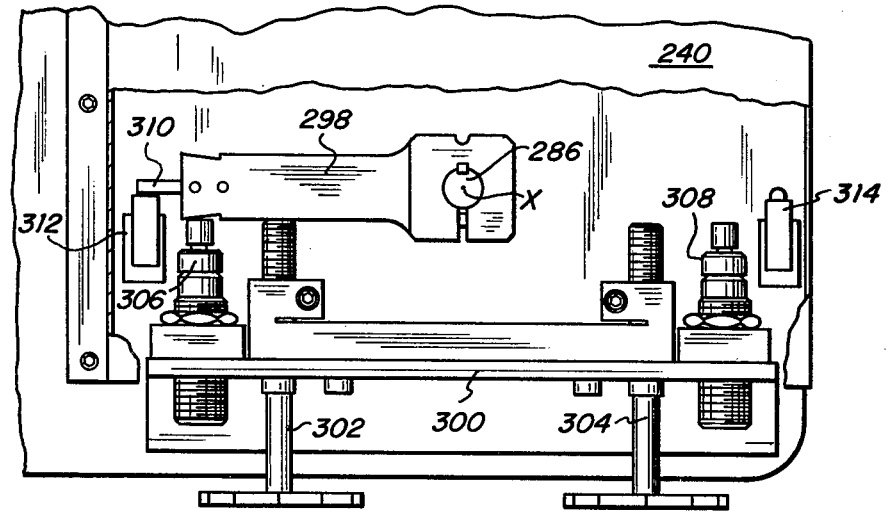
Figure 10:
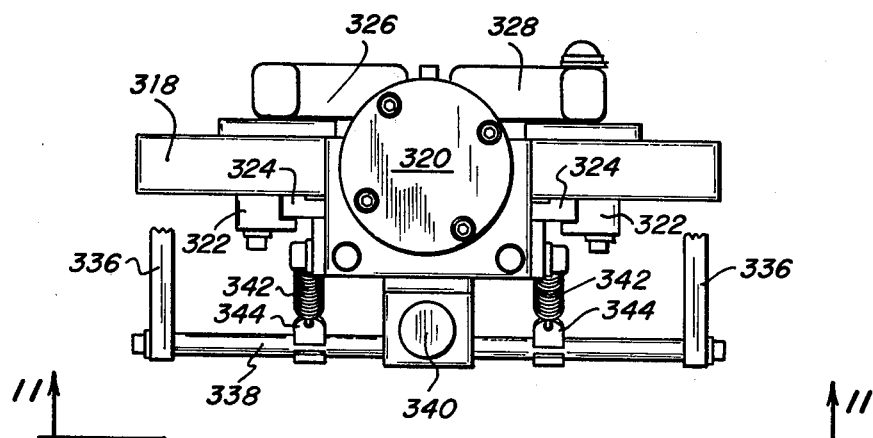
FIG. 10 is an oblique view of the setting clamp extension assembly along line 10—10 in FIG. 9 in the direction of the arrows.
Figure 11:
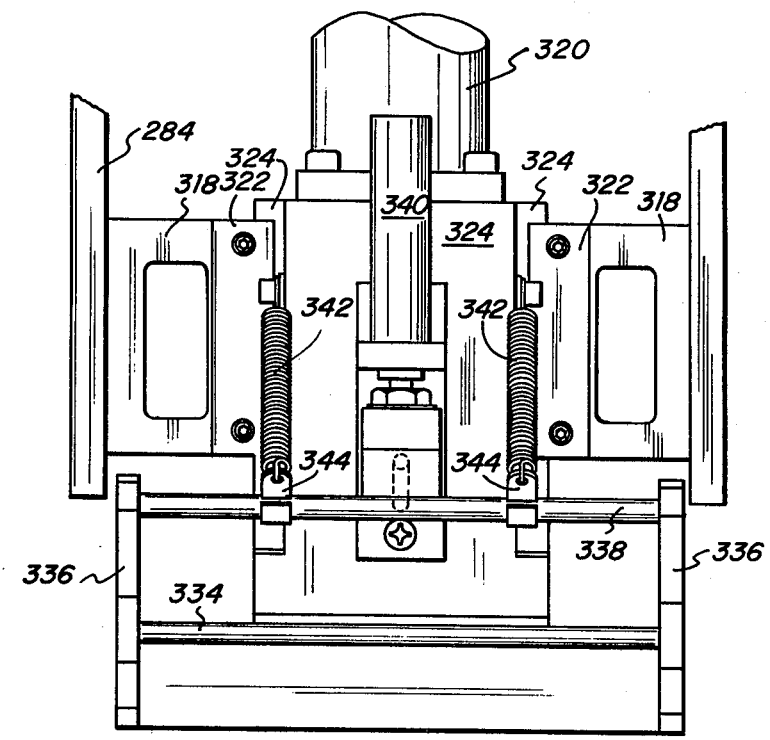
FIG. 11 is an oblique view of the setting clamp extension assembly taken along line 11—11 in FIG. 10 in the direction of the arrows.

The end of the shaft 286 extending from the side plate 240 mounts a limit motion arm 298 for rotation therewith. A bracket 300 extends from the side plate 240 as seen in FIGS. 8A and 8B. The bracket 300 threadedly receives adjusting screws 302 and 304. The adjusting screws 302 and 304 limit the motion of the setting clamp arm 284 by contact between the end of the screws 302 and 304 and the arm 298. Fluid shock absorbers 306 and 308 are similarly mounted on the bracket 300 to cushion the impact of the arm 298 against the adjusting screws 302 and 304. A sensor extension 310 is secured to the arm 298. The extension 310 activates sensors 312 and 314 mounted on the bracket 300 at the limits of motion of the arm 298.

The setting clamp assembly 282 also includes a setting clamp extension assembly 316 which is mounted at the end of the arm 284 as best seen in FIGS. 4, and 9–11. A base 318 is secured to the setting clamp arm 284 and supports a double acting fluid actuator 320. Gibs 322 are secured to the base 318 for slidably mounting an extension plate 324. Sensors 326 and 328 are mounted on the base 318 to sense the position of the extension assembly 316 in the retracted position, shown in solid line in FIG. 9, and the extended position, shown in phantom line in FIG. 9.

The plate 324 supports a lower jaw member 330. Upper jaw member 332 is pivoted along pivot shaft 334 to the plate 324. Extension arms 336 extend from each end of the upper jaw member 332 and are connected by a cross rod 338. A double acting fluid actuator 340 is connected to the plate 324 with the piston connected to a wedge 339. The actuator 340 is operable to move wedge 339 into engagement with cross rod 338 as seen in phantom line in FIG. 9 to pivot jaw member 332 to open and close the jaw members 330 and 332 to clamp a welt 12 therebetween. Springs 342 are secured between the extension plate 324 and brackets 344 on rod 338 to pivot jaw member 332 to urge the jaw members 330 and 332 in the clamping position.

A heater bar 346 is suspended from the apparatus 10 by a double acting fluid actuator 348 as seen in FIG. 2. Anvil 28 is supported beneath garment panel 14 and is moved upward to support the panel 14 during bonding. When the welt 12 is properly positioned on the garment panel 14, the heater bar 346 is actuated downward to press the welt 12 against the garment panel 14. The heater bar 346 is heated, preferably by electric resistance heating, to adhesively secure the welt 12 to the garment panel 14. Power is delivered through coil cord 349. Cord 349 has been found to resist fatigue failure during use of apparatus 10.

Figure 9:
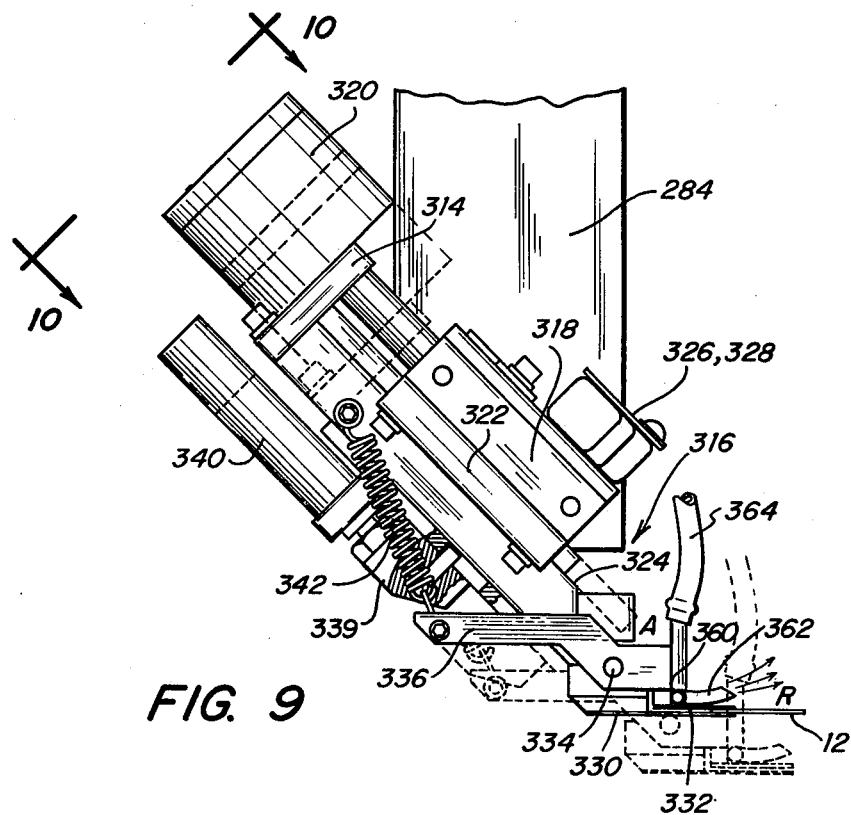
FIG. 9 is a vertical side view of the setting clamp extension assembly.

When the setting clamp extension assembly 316 positions the welt 12 for placement on the garment panel 14, the welt 12 is only clamped along one edge as best seen in FIG. 9. To prevent the welt 12 from folding under the assembly 316, an air manifold 360 is mounted on the upper jaw member 332. The manifold 360 includes a plurality of curved outwardly extending nozzles 362 which extend adjacent the edge of the upper jaw member 332. Air under pressure is provided through a delivery hose 364 to the manifold 360. As the air flows out the nozzles 362 as shown, a relative vacuum is created in region R which acts to support the welt 12 in a horizontal plane and counteracts the force of gravity. This effect is known as the Coanda effect.

Figure 12:
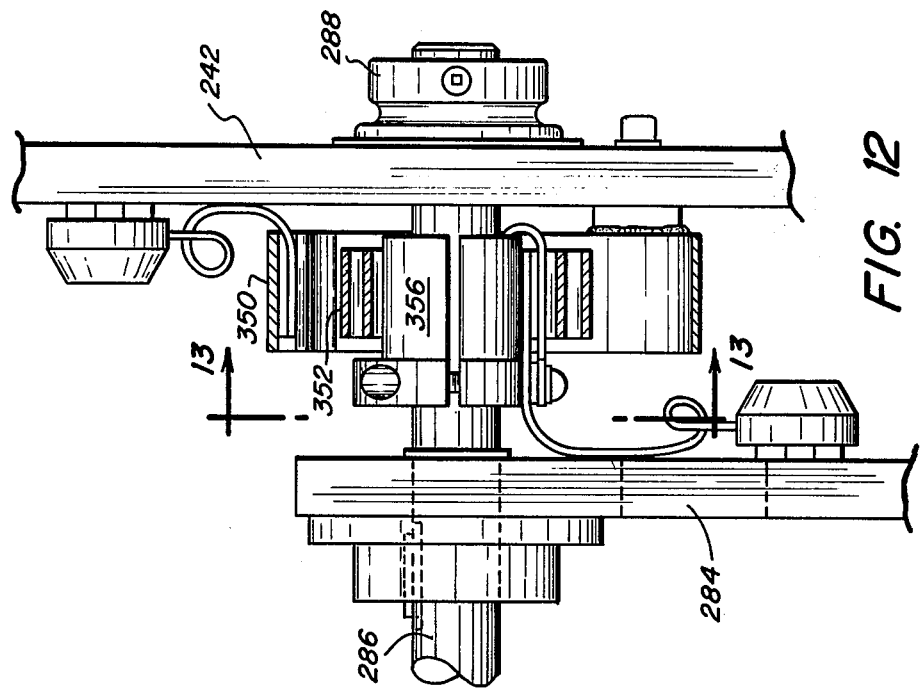
FIG. 12 is a detail of a portion of the pivot shaft of the setting clamp assembly and side plate.
Figure 13:
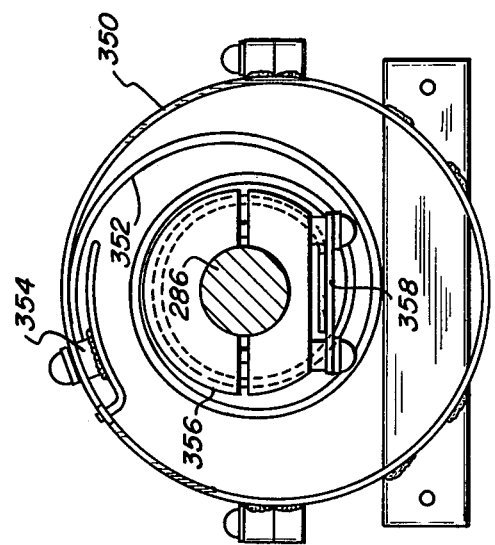
FIG. 13 is a view of the flexible connections between the side plate and setting clamp assembly taken along line 13—13 in FIG. 12 in the direction of the arrows.

Setting clamp extension assembly 316 requires both electrical and pressurized air connections for operation. FIGS. 12 and 13 illustrate the preferred construction for providing electrical energy to the assembly 316 on the pivoting arm 284. An outer cylindrical housing 350 is securely fastened to the side plate 242. One end of a conductor ribbon 352 is secured by a plate 354 to the outer cylindrical housing 350. The conductor ribbon 352 includes a plurality of conductors for providing power to the assembly 316 on the pivot arm 284 and to provide signal conductors between the assembly 316 on the pivot arm 284 and the remainder of the apparatus 10.

An inner cylindrical housing 356 is secured to the shaft 286 for rotation with the setting clamp arm 284. The ribbon 352 is coiled in a helical manner from the outer cylindrical housing 350 to the inner cylindrical housing 356 in a manner similar to the winding of a conventional watch spring as best illustrated in FIG. 13. The ribbon 352 is secured to the inner cylindrical housing 356 by a plate 358 for electrical connection to the assembly 316 within the pivoting arm. The pivotal motion of the arm 284 in receiving and positioning the welt 12 on the garment panel 14 requires only limited motion by the conductor ribbon 352 which increases the fatigue life of the connector. Air lines for supplying the assembly 316 on the setting clamp arm 284 can be similarly routed in a helical path to reduce fatigue wear.

During the trimming of the welt 12 by the trimming assembly 248, the setting clamp arm 284 is pivoted to a first position as shown in dotted line in FIG. 4 adjacent the welt 12 and the welt 12 is clamped along one edge between the jaw members 330 and 332 to complete step 44. The setting clamp arm 284 is pivoted to a second position as shown in solid line in FIG. 4 to position the welt 12 in a standby position adjacent the garment panel 14. In the standby position, the setting clamp extension assembly 316 is retracted to prevent interference with the template 16 to complete step 48.

The setting clamp extension assembly 316 is then extended to position the welt 12 on the garment panel 14 to complete step 50. The heater bar 346 is lowered and the anvil 28 is raised to clamp the welt 12 and garment panel 14 together to complete step 52. The heater bar 346 then heats adhesive between the welt 12 and garment panel 14 to bond them together to complete step 54. During the heating, the setting clamp extension assembly 316 will open and retract and the arm 284 pivots to the first position to receive another welt 12 to complete step 56.

It will be apparent from the discussion hereinabove that the apparatus 10 is capable of continuously positioning welts 12 at a desired position on garment panels 14 for attachment. The apparatus also performs the function of trimming the edges of the welt 12 and disposing of the waste material.

While only one embodiment of the present invention has been described in detail herein and shown in the accompanying drawings, it will be evident that various further modifications and substitutions of parts and elements are possible without departing from the scope and spirit of the invention.

We claim:

1. An apparatus for positioning a garment piece on a garment panel at a work station, comprising:
   holding clamp means for holding the garment piece in a fixed position;
   transfer clamp means for receiving the garment piece from said holding clamp means and for moving the garment piece in a first direction to a preselected position;
   trimming means for trimming at least one edge of the piece;
   setting clamp means for receiving the garment piece from that transfer clamp means and for transferring the piece to the work station and positioning the piece on the garment panel; and
   means at the work station for adhering the garment piece to the garment panel.

2. The apparatus of claim 1 wherein said holding clamp means includes:
   a holding clamp base means for slidable motion along a second direction transverse the first direction;
   actuator means for moving said holding clamp base means along the second direction; and
   a holding clamp mounted on said holding clamp base means for clamping the piece with a predetermined force, said apparatus further having structure defining a guide surface to align the piece in the second direction, the holding clamp clamping the piece and said actuator means moving said holding clamp to move the piece against the guide surface for aligning the piece.

3. The apparatus of claim 1 wherein the transfer clamp means includes:
   transfer clamp base means for slidable motion in the first direction;
   actuator means for moving said transfer clamp base means along the first direction;
   a transfer clamp mounted on said transfer clamp base means for clamping the piece; and
   sensor means for sensing an edge of the piece, said transfer clamp base means being positioned with said actuator means in response to said sensor means to clamp the piece with said transfer clamp at a predetermined position relative to the edge sensed, said transfer clamp clamping the piece and said actuator means moving the piece into the preselected position.

4. The apparatus of claim 1 wherein said trimming means includes:
   a trimming assembly base means for motion in the second direction;
   actuator means for moving said trimming assembly base means along the second direction; and
   first and second cutting means mounted on said trimming assembly base means for trimming the piece separated a predetermined distance along the first direction, said trimming assembly base means being moved along the second direction when the piece is in the preselected position by said actuator means and said first and second cutting means operated to trim the edges of the piece.

5. The apparatus of claim 4 further comprising a nozzle for connection to a vacuum source and a valve operable during the trimming operation to the open position to draw the trimmed pieces into the nozzle for disposal.

6. The apparatus of claim 1 wherein said setting clamp means includes:
a setting clamp arm mounted for pivotal motion between a first position for receiving a piece and a second position for placement of the piece on the garment panel;
means for pivoting said setting clamp arm between the first and second positions; and
a setting clamp mounted on said setting clamp arm for clamping the welt in the first position and releasing the welt on the garment panel in the second position.

7. The apparatus of claim 6 further comprising flexible connectors for connecting the apparatus and the pivoting setting clamp arm, one end of each of said flexible conductors being secured to the apparatus and setting clamp arm and said conductors being wrapped in a helical manner between their ends to reduce fatigue wear during pivoting motion.

8. The apparatus of claim 6 wherein said setting clamp means further includes a manifold proximate said setting clamp having at least one curved nozzle extending proximate the setting clamp and piece clamped thereby for directing pressurized air across an unclamped portion of the piece to support the piece against gravity through the Coanda effect.

9. The apparatus of claim 6 wherein said setting clamp means further includes a setting clamp extension means for extending the setting clamp from said setting clamp arm to position the piece on the garment panel.

10. The apparatus of claim 1 wherein the garment pieces comprise welts positioned along a backing tape at predetermined separations, the apparatus further comprising supply reel means for storing the welts and the backing layer, said transfer clamp means drawing welts and backing layer from said supply reel means upon motion of a clamped welt to the preselected position.

11. An apparatus for positioning and securing welts on garment panels, the welts being positioned at predetermined distances along a continuous backing layer, comprising:
a frame, a portion of said frame defining at least one guide surface extending along a first direction;
a holding clamp assembly including:
 (a) a holding clamp base slidably mounted on said frame for motion in a second direction transverse the plane of the guide surface;
 (b) actuator means for moving said holding clamp base along the second direction;
 (c) a holding clamp mounted on said holding clamp base for clamping a welt, said holding clamp including spring means for clamping the welt with a predetermined force, said actuator means moving said holding clamp base along the second direction with a welt clamped by said holding clamp to bring the welt into contact with and align the welt against the guide surface, said spring means permitting the welt to slide within said holding clamp upon alignment of the welt;
a transfer clamp assembly including:
 (a) a transfer clamp base slidably mounted on said frame for motion along the first direction between first and second positions;
 (b) actuator means for moving said transfer clamp base along the frame between the first and second positions;
 (c) a transfer clamp mounted on said transfer clamp base for clamping the welt;
 (d) a sensor means mounted on said transfer clamp base for sensing an edge of the welt generally extending in the second direction, said actuator means moving said transfer clamp base in response to said sensor means to clamp the welt at a predetermined distance from the edge and moving the welt to a preselected position as said transfer clamp base moves to said first position;
a trimming assembly including:
 (a) a trimming assembly base slidably mounted on said frame for motion in the second direction;
 (b) actuator means for moving said trimming assembly base along the second direction;
 (c) first and second cutting blade assemblies mounted on said trimming assembly base, each cutting blade assembly for trimming the welt along a line extending in the second direction, said first and second cutting blade assemblies being separated a predetermined distance in the first direction, said actuator means moving said trimming assembly base toward the welt in the preselected position for trimming the welt with said first and second cutting blade assemblies;
a setting clamp assembly including:
 (a) a setting clamp arm pivotally mounted on said frame for pivotal motion between a first position and a second position;
 (b) a setting clamp mounted on said setting clamp arm for clamping the welt in the first position and releasing the welt at the second position;
 (c) actuator means for pivoting said setting clamp arm between the first and second positions, said setting clamp clamping the welt in the preselected position with said setting clamp arm in the first position, said setting clamp arm pivoting to the second position upon trimming of the welt to position the welt at the garment panel; and
heating means for holding the welt against the garment panel and activating an adhesive to fasten the welt to the garment panel upon release of said setting clamp.

12. The apparatus of claim 11 wherein said transfer clamp assembly includes a stop surface formed on said transfer clamp base, said sensor means including;
an arm pivotally mounted on said transfer clamp base;
spring means for urging said pivotal arm against the stop surface on said transfer clamp base; and
a sensor positioned along said pivotal arm for sensing the edge of the welt with the pivotal arm against the stop surface while permitting the pivotal arm and sensor to be pivoted away from the stop surface during motion of the transfer clamp base to the forward position.

13. The apparatus of claim 11 further comprising a vacuum nozzle mounted on said frame proximate the preselected position for connection to a vacuum source and a valve mounted on said nozzle for opening the nozzle during trimming of the welt to dispose of materials trimmed from the welt and the backing layer.

14. The apparatus of claim 11 wherein said setting clamp assembly requires flexible conductors extending from said frame to said pivoting setting clamp arm, said apparatus further including:

a first mount positioned on said frame, one end of said flexible conductors being secured on said first mount; and a second mount secured for motion with said setting clamp arm, the opposite end of said flexible conductor being secured on said second mount, the flexible conductor being wrapped in a helical manner between the first and second mounts to permit relative rotation between said mounts during pivotal motion of said setting clamp arm.

15. The apparatus of claim 11 wherein said setting clamp assembly further includes an air manifold mounted on said setting clamp having at least one curved nozzle for connection to a source of pressurized air, the nozzle being positioned to create a relative vacuum above the unclamped portion of the welt to counteract the downward force of gravity to prevent folding of the welt.

16. The apparatus of claim 11 wherein said setting clamp assembly further includes:

a setting clamp extension base slidably mounted on said setting clamp extension arm for motion between extended and retracted positions; and actuator means for moving said setting clamp extension base between the extended and retracted positions, said setting clamp being mounted on said setting clamp extension base so that said setting clamp arm can be pivoted into the second position with said setting clamp extension base in the retracted position to prevent contact between said setting clamp assembly and the garment panel, said setting clamp positioning the welt on the garment panel as said setting clamp extension base is extended.

17. The apparatus of claim 11 further comprising a rotatable supply reel for containing the welts and backing layer, the reel having resistance to rotation to resist uncontrolled rotation of the reel.

18. The apparatus of claim 11 wherein said setting clamp assembly further includes:

a shaft pivotally mounted on said frame on which said setting clamp arm is secured for pivotal motion, said shaft having a toothed gear and a limit motion arm secured thereto;

a rack slidably mounted on said frame having teeth intermeshed with the teeth on said gear;

an actuator means for moving said rack to pivot said setting clamp arm;

first and second limit stops for contacting said limit motion arm to limit motion of said setting clamp arm between the first and second positions; and first and second shock absorber means for absorbing the impact between the limit motion arm and said first and second stops, respectively.

19. An apparatus for positioning and securing welts on garment panels, the welts being secured at predetermined intervals along a continuous backing tape, comprising:

a frame having at least two positioning fingers, each of said fingers having a flat guide surface extending in a first direction;

a holding clamp assembly including:
(a) a holding clamp base slidably mounted on said frame for motion along a second direction transverse the first direction;
(b) a fluid actuator secured between said holding clamp base and said frame for moving said holding clamp base;
(c) a holding clamp mounted on said holding clamp base including a channel and first and second jaw members pivotally secured within said channel, each of said jaw members having slots formed therein for receiving the positioning fingers;
(d) spring means for urging the jaw members together to clamp a welt therebetween;
(e) fluid actuation means for separating the jaw members to release the welt, said holding clamp assembly acting to clamp the welt and move the welt toward the positioning fingers until an edge of the welt contacts the guide surfaces on the positioning fingers to align the welt in the first direction, said spring means permitting the welt to slip between the jaw members after contact and alignment against the guide surfaces;

a transfer clamp assembly including:
(a) a transfer clamp base slidably mounted on said frame for motion along the first direction between a rearward and forward position;
(b) a fluid actuator secured between said frame and said transfer clamp base for moving said transfer clamp base between the forward and rearward positions;
(c) a transfer clamp mounted on said transfer clamp base including a channel and first and second jaw members pivotally secured therein;
(d) fluid actuator means for closing the first and second jaw member to clamp a welt therebetween and opening the first and second jaw members to release the welt;
(e) sensor means for sensing an edge of the welt generally perpendicular to the first direction when said transfer clamp base is in the rearward position, said transfer clamp base being moved along the first direction in response to the sensing of said sensor means to clamp the welt with said transfer clamp at a predetermined separation from said edge of the welt with the welt still clamped by said holding clamp assembly, said transfer clamp base being moved to the forward position to move the clamped welt into a preselected position relative to said frame;

a trimming assembly including:
(a) a trimming assembly base slidably mounted on said frame for motion in the second direction between retracted and extended positions;
(b) a fluid actuator positioned between said trimming assembly base and said frame for moving said trimming assembly base in the second direction;
(c) first and second cutting blade assemblies for trimming the welt, the assemblies being positioned on said trimming assembly base for cutting the welt along the second direction, each of said assemblies being separated by a predetermined distance in the first direction, the welt being trimmed in the preselected position by said first and second cutting blade assemblies with said trimming assembly base moved to the extended position;

a setting clamp assembly including:
(a) a setting clamp arm mounted on said frame for pivotal motion between first and second positions;
(b) a fluid actuator means for pivoting said setting clamp arm between the first and second positions;

(c) a setting clamp extension base slidably mounted on said setting clamp arm for motion between extended and retracted positions;

(d) a fluid actuator secured between said setting clamp arm and said setting clamp extension base for moving said setting clamp extension base between the extended and retracted positions;

(e) a setting clamp mounted on said setting clamp extension base including a channel and first and second jaw members pivotally supported within said channel;

(f) a fluid actuator for pivoting said jaw members together to clamp a welt and moving said jaw members apart to release a clamped welt;

(g) an air manifold having a plurality of curved nozzles opening adjacent to an unclamped area of a welt clamped in said setting clamp and directed upward from the unclamped area to create a relative vacuum to support the welt against the force of gravity to prevent folding of the welt, said setting clamp arm in the first position permitting the setting clamp to clamp the welt at the preselected position, pivotal motion of said setting clamp arm to the second position positioning the clamped welt adjacent the garment panel, extension of said setting clamp extension base positioning the clamped welt on the garment panel; and means for clamping and securing the welt on the garment panel.

20. The apparatus of claim 19 wherein said transfer clamp base defines a stop, said sensor means including:

a pivotal arm mounted for pivotal motion on said transfer clamp base, the stop limiting the pivotal motion of said pivotal arm;

a spring secured between said pivotal arm and transfer clamp base for urging said pivotal arm against the stop; and a photoelectric source and receiver, each mounted on said pivotal arm for positioning on opposite sides of a welt to sense an edge of a welt with said pivotal arm against the stop, said pivotal arm pivoting to permit movement of said transfer clamp base to the forward position.

21. The apparatus of claim 19 further comprising:

a nozzle mounted on said frame having a passage therethrough for communication with a vacuum source; and a valve for opening and closing the passage operable to permit the passage to open when a welt is trimmed to collect the trimmed material and cut backing layer through the passage for disposal.

22. The apparatus of claim 19 wherein said setting clamp assembly further includes a shaft pivotally mounted on said frame for securing said setting clamp arm, the operation of said setting clamp assembly requiring a flexible conductor to pass between said frame and said setting clamp arm, said setting clamp assembly further comprising:

a first mounting fixture secured on said frame and mounting a first end of the flexible conductor; and a second mounting fixture secured on said shaft, the opposite end of said flexible conductor being secured to said second mounting fixture, the flexible conductor being wrapped in a helical manner between said fixtures to permit movement between said fixtures as said setting clamp arm pivots between the first and second positions.

23. The apparatus of claim 19 wherein said setting clamp assembly further includes a shaft pivotally mounted on said frame and securing said setting clamp arm, said shaft mounting a gear having teeth about its outer periphery and a limit motion arm extending radially outward from said shaft, said fluid actuator means for pivoting said setting clamp arm including a gear rack slidably mounted on said frame, the teeth of said gear rack engaging the teeth of said gear secured to the shaft and a fluid actuator for sliding the gear rack to pivot the setting clamp arm between the first and second positions, said apparatus further comprising first and second limit stops mounted on said frame for contacting the limit motion arm to limit motion of said setting clamp arm between the first and second positions and first and second shock absorber means for absorbing the impact of the limit motion arm against said first and second stops, respectively.

24. A method for positioning a welt on a garment panel at a work station, the welt being supplied from a source along a first direction, comprising the steps of:

holding the welt with a holding clamp and moving the holding clamp and welt in a second direction transverse the first direction to align the welt against fixed members defining guide surfaces;

clamping the welt with a transfer clamp and moving the clamped welt in the first direction to a preselected position;

trimming at least one edge of the welt along the second direction;

clamping the welt with a setting clamp and moving the welt to the work station; and securing the welt to the garment panel at the work station.

25. A method for positioning welts onto garment panels at a work station, the welts being mounted along a backing tape, comprising the steps of:

holding a welt with a holding clamp with the backing tape extending along the first direction, the holding clamp including first and second jaw members having slots therein for receiving fixed fingers defining guide surfaces and moving the holding clamp and welt in a second direction transverse the first direction, one side of the welt contacting the guide surfaces to align the welt, the holding clamp permitting the welt to slip through the jaw members upon alignment against the guide surfaces;

sensing the position of an edge of the welt extending along the second direction with a sensor on a transfer clamp and clamping the welt with the transfer clamp at a predetermined distance from the edge;

moving the transfer clamp and clamped welt in the first direction to a preselected position;

moving a trimming assembly toward the welt in the preselected position, and trimming the edges of the welt extending in the second direction with cutting blade assemblies separated a predetermined distance in the first direction;

clamping the welt along one edge extending in the first direction with a setting clamp and pivoting the setting clamp to move the welt proximate the work station and extending the setting clamp to position the welt against the garment panel; and securing the welt to the garment panel.

* * * * *

UNITED STATES PATENT AND TRADEMARK OFFICE
CERTIFICATE OF CORRECTION

PATENT NO. : 4,448,626

DATED : May 15, 1984

INVENTOR(S) : Joseph W. A. Off, Judson H. Early, Daniel K. Roady and Theodore B. Thayer It is certified that error appears in the above-identified patent and that said Letters Patent is hereby corrected as shown below:

Column 5, line 43, change "2" to --12--.

Signed and Sealed this

Fourth Day of December 1984

[SEAL]

Attest:

GERALD J. MOSSINGHOFF

Attesting Officer     Commissioner of Patents and Trademarks